United States Patent [19]

McCrary

[11] 4,385,999
[45] May 31, 1983

[54] SULFONATED GILSONITE DRILLING MUD ADDITIVE

[76] Inventor: Jack L. McCrary, 207 Broadmoor Blvd., Lafayette, La. 70503

[21] Appl. No.: 291,161

[22] Filed: Aug. 10, 1981

[51] Int. Cl.$^3$ ............................................... C09K 7/02
[52] U.S. Cl. .................................. 252/8.5 C; 175/72
[58] Field of Search ........... 252/8.5 A, 8.5 C, 8.5 LC; 208/44

[56] References Cited

U.S. PATENT DOCUMENTS

| | | | |
|---|---|---|---|
| 2,650,197 | 8/1953 | Rahn | 252/8.5 |
| 3,028,333 | 4/1962 | Stratton et al. | 252/8.5 |
| 3,039,958 | 6/1962 | Monroe | 252/8.5 |
| 3,089,842 | 5/1963 | Stratton | 252/8.5 X |
| 3,700,728 | 10/1972 | Moschopedis et al. | 252/8.5 X |

Primary Examiner—Herbert B. Guynn

[57] ABSTRACT

A sulfonated gilsonite used in a drilling mud for drilling a well wherein the sulfonated gilsonite is prepared by reacting at a temperature between 210°–280° F. with a mixture of water, gilsonite having a softening point of at least 300° F., lignite, sulfonating compound and water soluble based compound for a period of time to sulfonate the gilsonite.

9 Claims, No Drawings

SULFONATED GILSONITE DRILLING MUD ADDITIVE

BACKGROUND OF THE INVENTION

1. Field of the Invention

This invention relates, in general, to the process of drilling a well, and, more particularly, to drilling mud used in the drilling process, and, still more particularly, to a drilling mud containing sulfonated gilsonite.

2. Prior Art

In the course of drilling oil and gas wells and the like by means of a rotary well drilling apparatus, circulation fluid or drilling mud is pumped down through a rotary drill pipe and discharged at or adjacent the bit at the lower end thereof. In normal drilling operations, a portion of this circulation fluid returns upward through the well bore and is conducted to a sump where it is filtered and returned to the pump and again pumped down the drill pipe.

The primary functions of the circulation fluid or drilling mud are: (1) to lubricate and cool the drilling bit; (2) to suspend the cuttings from the drilling operations so that they are carried to the surface and removed; (3) to prevent excessive amounts of fluids from flowing from the hole into surrounding formations by depositing on the wall of the hole a thin, but substantial, impervious filter cake; (4) to serve as a weighting material exerting sufficient pressure to counterbalance any pressure exerted by water, gas, oil, or other earth fluid; and (5) to prevent caving or other intrusions into the drill hole.

Thus, an efficient drilling mud must exhibit numerous characteristics, including, for example, viscosity, initial and 10-minute gel strength, thixotropy, fluid loss prevention, stability under various temperature and pressure operating conditions, stability against contaminating fluids, such as salt water, calcium sulfate, cement and potassium contaminated fluids, etc.

To achieve a drilling mud exhibiting the above characteristics and properties, extensive research has been conducted, resulting in a multitude of drilling muds having a variety of additives to help a particular problem. A more detailed discussion of various proposed solutions to these problems can be seen in the following patents:

| U.S. Pat. No. | Inventor | Issue Date |
| --- | --- | --- |
| 2,579,453 | Earl E. Post, et al | 12/25/51 |
| 2,634,098 | Arthur L. Armentrout | 4/07/53 |
| 2,667,224 | G.C. Howard | 1/26/54 |
| 2,773,670 | George Miller | 12/11/56 |
| 2,812,161 | Eldon J. Mayhew | 11/05/57 |
| 2,935,473 | E.G. King, et al | 5/03/60 |
| 3,006,846 | Charles A. Stratton | 10/31/61 |
| 3,020,232 | Joseph Bayne Doughty | 2/06/62 |
| 3,034,982 | K.P. Monroe | 5/15/62 |
| 3,070,165 | Charles A. Stratton | 12/25/62 |
| 3,089,842 | Charles A. Stratton | 5/14/63 |
| 3,095,392 | F.W. Herrick | 6/25/63 |
| 3,135,727 | K.P. Monroe | 6/02/64 |
| 3,200,070 | F.W. Herrick | 8/10/65 |
| 3,244,623 | Ellis Gray King, et al | 4/05/66 |
| 3,280,912 | J.R. Sheffield, Jr. | 10/25/66 |
| 3,322,668 | Ison G. Fontenot, et al | 5/30/67 |
| 3,388,061 | Aaron E. Markham | 6/11/68 |
| 3,686,119 | Aaron E. Markham, et al | 8/22/72 |
| 3,700,728 | Speros E. Moschopedis, et al | 10/24/72 |

However, none of the present day drilling muds provide at both high and low temperatures, as well as a broad spectrum of actual drilling conditions, the desired degree of function performance needed by the industry.

SUMMARY OF THE INVENTION

Therefore, an object of this invention is to provide a drilling mud having improved fluid loss control at high temperature, high pressure operating conditions.

Another object of this invention is to produce a drilling fluid additive which will give stability to the well base, and reduce the possibility of shale intrusion.

A still further object is to provide a simplified process for sulfonation of gilsonite.

A still further object of this invention is to produce a drilling fluid additive which is compatible and readily dispersible in water based fluid and does not require the addition of emulsifying agents which are commonly used with regular unreacted gilsonite to keep the material in suspension.

Still another object of this invention is to provide a drilling mud additive that enhances the lubrication characteristics of the drilling mud.

Other objects and advantages of this invention will become apparent from the ensuing descriptions of the invention.

Accordingly, a sulfonated gilsonite for use in well drilling mud is provided, which sulfonated gilsonite is produced by reacting together at a temperature between 210°–280° F., a mixture of gilsonite having a softening point of at least 300° F., lignite, sulfonating compound, water soluble base compound and water for a period of time sufficient to sulfonate the gilsonite, and then removing any remaining water.

PREFERRED EMBODIMENTS OF THE INVENTION

In a common reaction zone, a mixture of water, gilsonite, having a softening point of at least 300° F., lignite, a sulfonating compound, preferably sodium sulfite, and a water soluble base compound, preferably sodium hydroxide, are stirred at a temperature between 210°–280° F. for a period of time sufficient to sulfonate the gilsonite, preferably 0.5–3 hours. Once the sulfonation is completed, the remaining water is removed by spray drying or other conventional drying means.

In a preferred embodiment, water is mixed in a reaction zone with a mixture of components having percent by weight ratios of:

| | |
| --- | --- |
| Gilsonite | 55–60% |
| Lignite | 15–25% |
| Sodium Sulfite | 15–20% |
| Sodium Hydroxide | 5–10% | for a period of time between 0.5–3.0 hours.

In another preferred embodiment, the reaction zone temperature is maintained between 230°–260° F.

The drilling fluids of this invention can be prepared by any conventional method. The amount of sulfonated gilsonite, and water employed are dependent upon several variables, such as the density of the drilling fluid desired, the nature of the formation penetrated, as well as other well known factors. In addition, other materials can be added to the drilling mud for weighting purposes, etc.

There are, of course, other obvious embodiments of the invention not specifically disclosed, but which are intended to be included within the scope of the invention as defined in the following Claims.

What I claim is:

1. A process for making sulfonated gilsonite to be used as an additive in a drilling fluid which comprises:
   (a) reacting in a reaction zone water with a mixture of gilsonite having a softening point of at least 300° F., lignite, sodium sulfite and a water soluble base compound at a temperature between 210°-280° F. for a period of time sufficient to achieve sulfonation of said gilsonite, wherein the percent by weight of the components of said mixture introduced into said reaction is:

| | |
   |---|---|
   | Gilsonite | 55-60% |
   | Lignite | 15-25% |
   | Sodium Sulfite | 15-20% |
   | Water Soluble Base Compound | 5-10%; | and,
   (b) removing from the reacted mixture by drying said water remaining.

2. A process according to claim 1, wherein said water comprises 25%-50% by weight of the mixture of said reaction zone.

3. A process according to claim 1, wherein said temperature is between 230°-260° F.

4. A process according to claim 1, wherein said period of time is 0.5-3 hours.

5. A water base drilling fluid comprising water and sulfonated gilsonite, said sulfonated gilsonite being prepared by reacting at a temperature between 210°-280° F., a mixture of water, gilsonite having a softening point of at least 300° F., lignite sodium sulfite and water soluble base compound for a period of time sufficient to achieve sulfonation of said gilsonite wherein the percent by weight of the components of said mixture is:

| | |
   |---|---|
   | Gilsonite | 55-60% |
   | Lignite | 15-25% |
   | Sodium Sulfite | 15-20% |
   | Water soluble Base Compound | 5-10%. |

6. A drilling fluid according to claim 5, wherein said temperature is between 230°-260° F.

7. In a process of drilling a well, the improvement of which comprises the step of circulating in said well water drilling fluid comprising an aqueous fluid medium and sulfonated gilsonite, said sulfonated gilsonite being prepared by reacting at a temperature between 210°-280° F., a mixture of water, gilsonite having a softening point of at least 300° F., lignite, sodium sulfite and water soluble base compound for a period of time sufficient to achieve sulfonation of said gilsonite, wherein the percent by weight of the components of said mixture is:

| | |
   |---|---|
   | Gilsonite | 55-60% |
   | Lignite | 15-25% |
   | Sodium Sulfite | 15-20% |
   | Water Soluble Base Compound | 5-10%. |

8. In a process according to claim 7, wherein said temperature is between 230°-260° F.

9. A sulfonated gilsonite prepared according to claim 1.

* * * * *